Jan. 19, 1943.   O. STEINER   2,308,725
PHOTOGRAPHIC SHUTTER AND SYNCHRONIZING SYSTEM
Original Filed Dec. 3, 1940   6 Sheets-Sheet 1
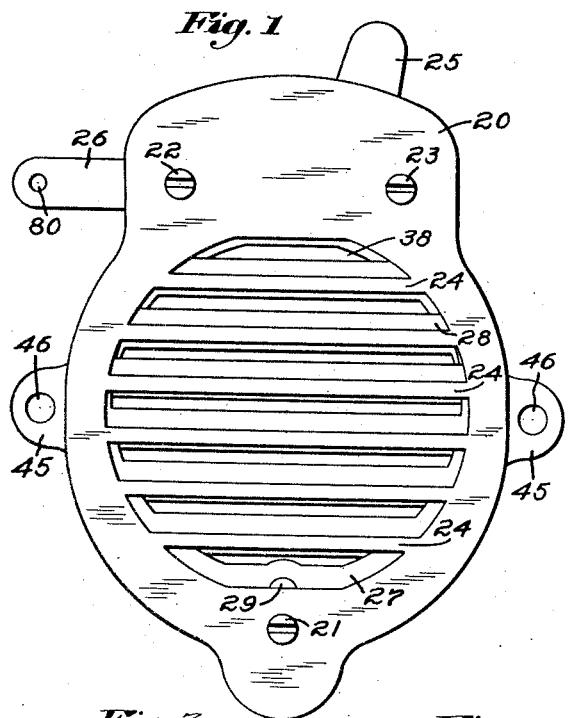
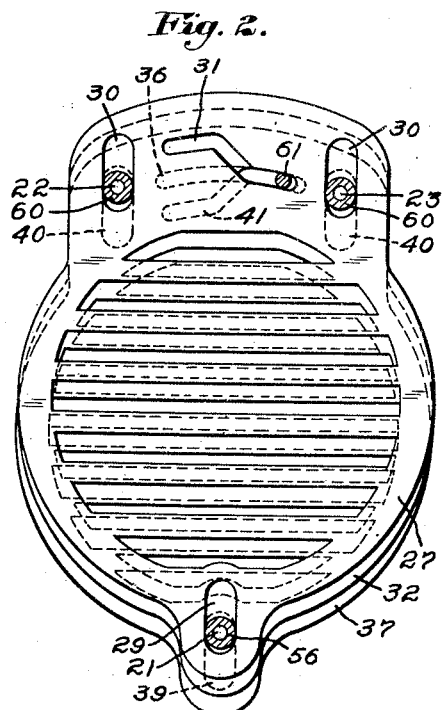
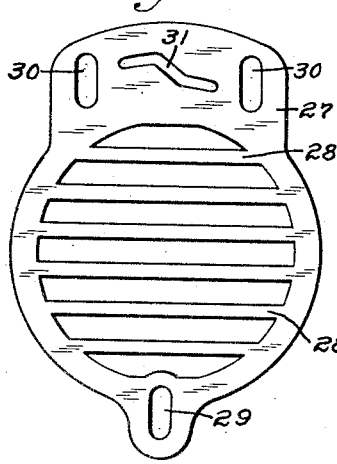
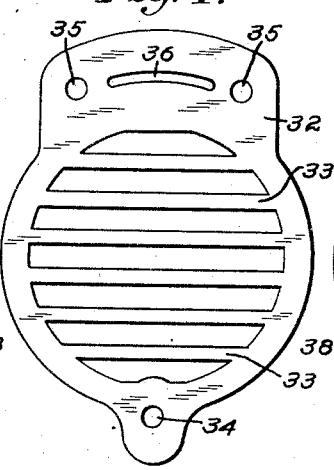
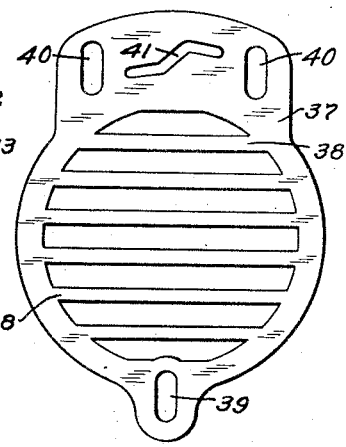
Inventor:
Oscar Steiner,
Attys.

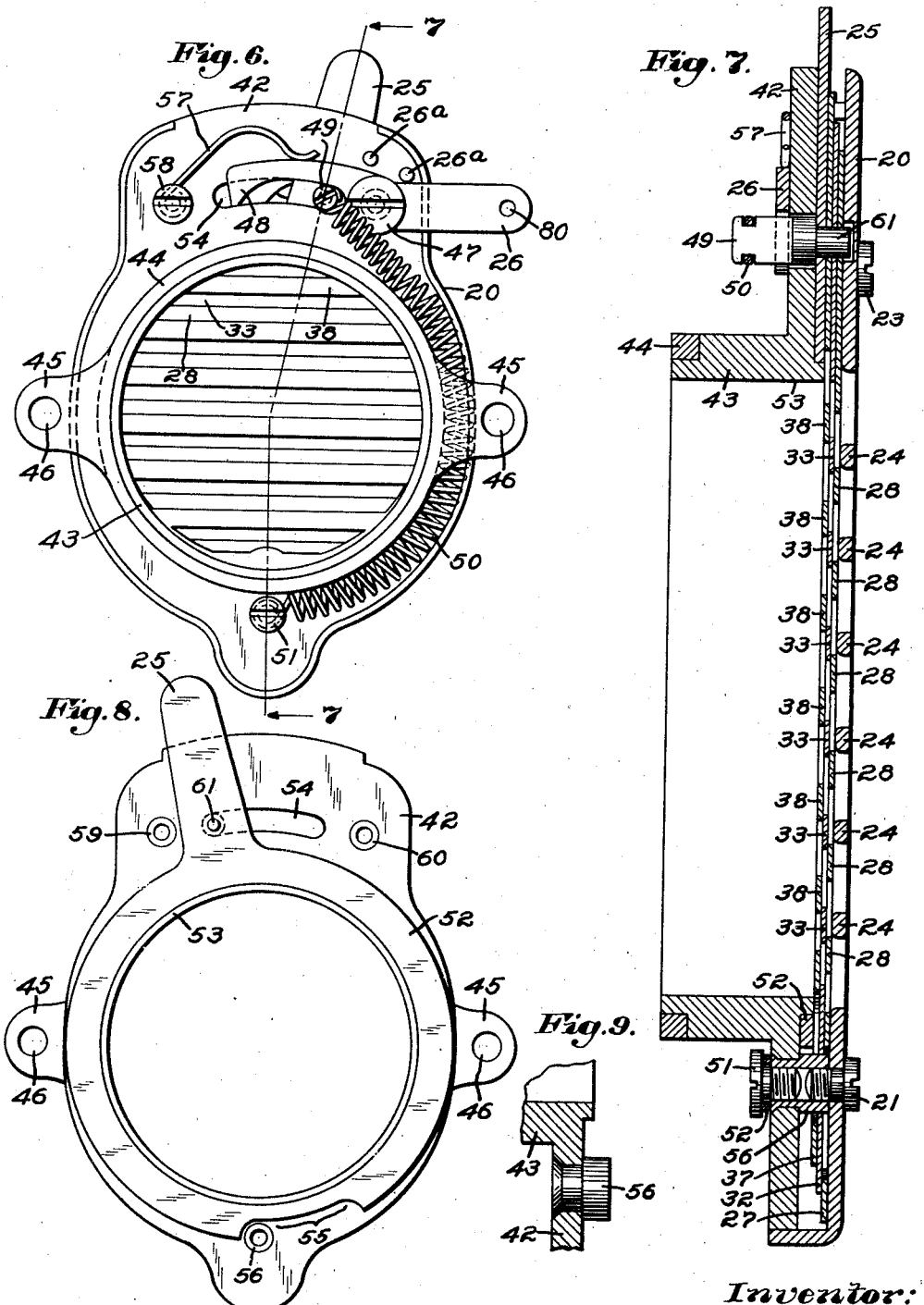

Jan. 19, 1943.　　　O. STEINER　　　2,308,725
PHOTOGRAPHIC SHUTTER AND SYNCHRONIZING SYSTEM
Original Filed Dec. 3, 1940　　6 Sheets-Sheet 3

Inventor:
Oscar Steiner,

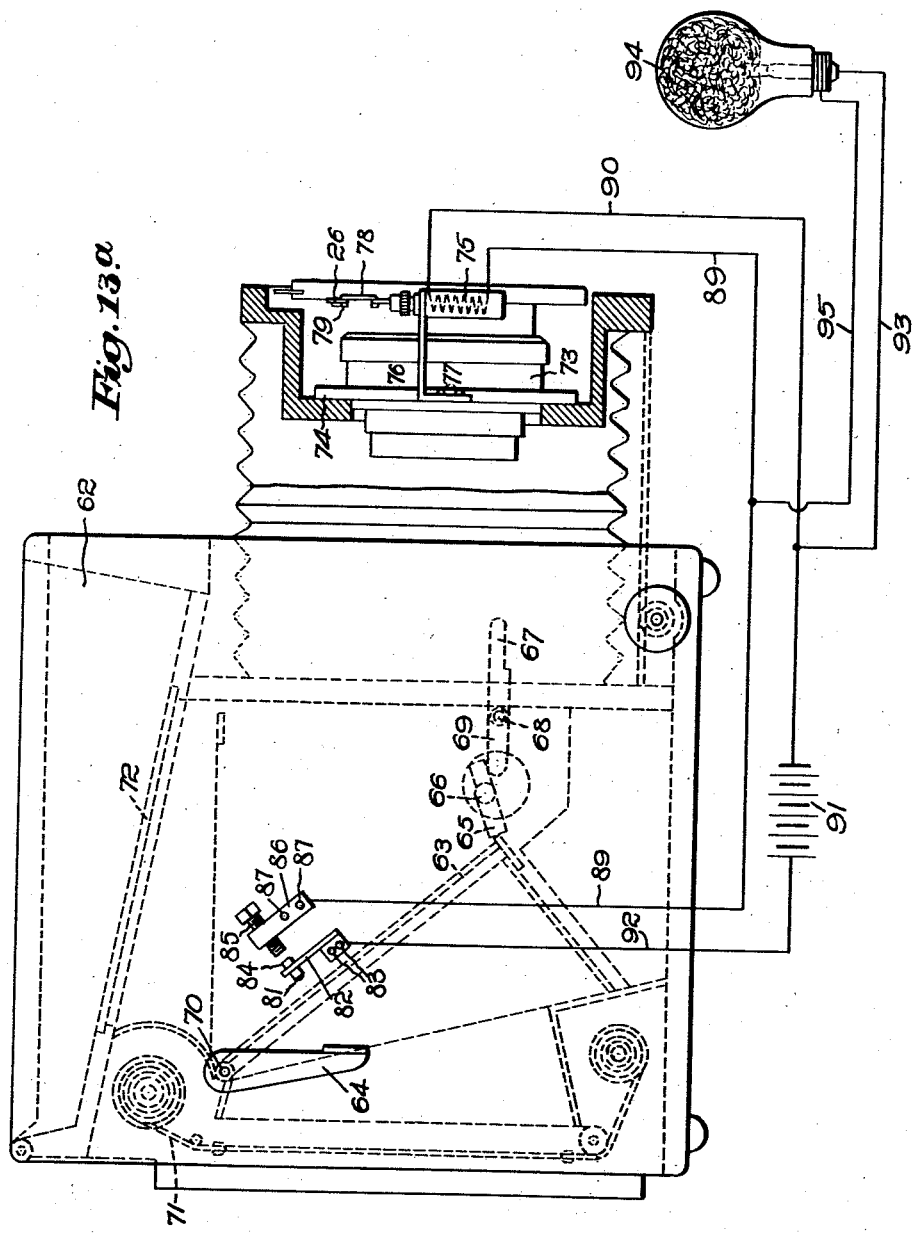

Jan. 19, 1943.　　　O. STEINER　　　2,308,725
PHOTOGRAPHIC SHUTTER AND SYNCHRONIZING SYSTEM
Original Filed Dec. 3, 1940　　6 Sheets-Sheet 5

Inventor:
Oscar Steiner,

Jan. 19, 1943.  O. STEINER  2,308,725
PHOTOGRAPHIC SHUTTER AND SYNCHRONIZING SYSTEM
Original Filed Dec. 3, 1940   6 Sheets-Sheet 6
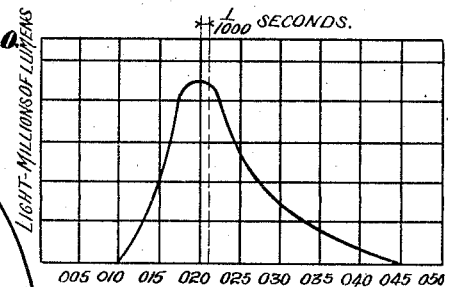
Fig. 20.
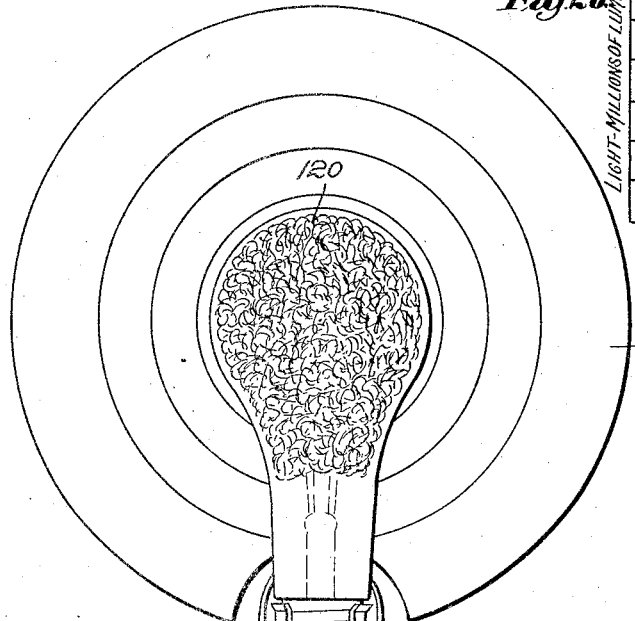
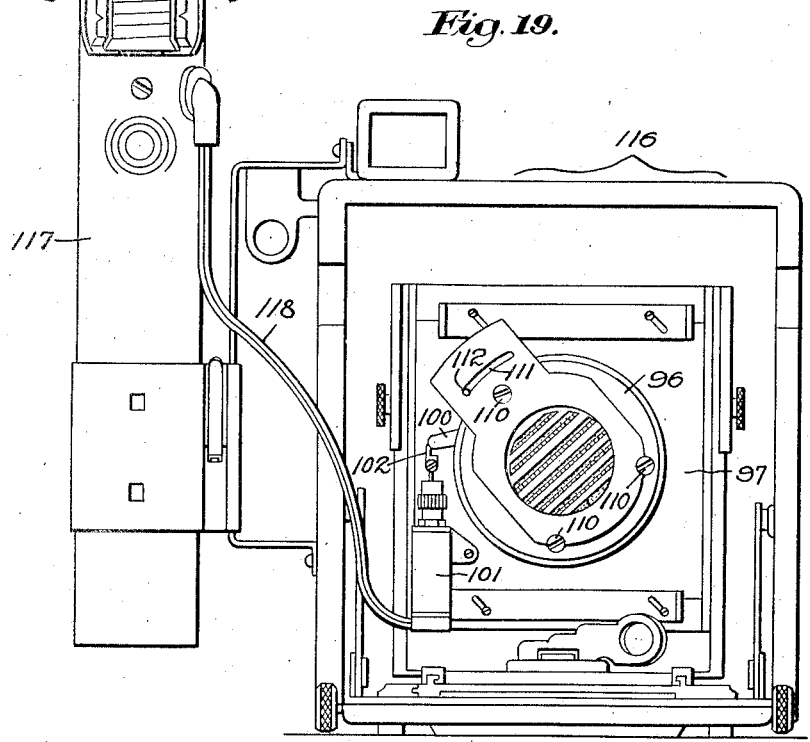
Fig. 19.
Inventor:
Oscar Steiner, Patented Jan. 19, 1943

2,308,725

UNITED STATES PATENT OFFICE 2,308,725

PHOTOGRAPHIC SHUTTER AND SYN-CHRONIZING SYSTEM

Oscar Steiner, Rochester, N. Y., assignor to The Folmer Graflex Corporation, Rochester, N. Y., a corporation of Delaware Original application December 3, 1940, Serial No. 368,394. Divided and this application June 19, 1941, Serial No. 398,790

30 Claims. (Cl. 67—29)

This application is a division of my co-pending application Ser. No. 368,394, filed December 3, 1940.

This invention relates to a photographic shutter and synchronizing system, and particularly for effecting synchronization of a shutter of the so-called "grid shutter" type with photo-flash lamps, and with another shutter of the camera, thereby obtaining a greatly increased speed of exposure, in synchronization with the peak of illumination of the photo-flash lamp.

In order that the principle of the invention may be readily understood, I have disclosed two embodiments of the mechanism thereof.

In the drawings—

Fig. 1 is a front elevation of the grid shutter when in a set condition ready to make an exposure;

Fig. 2 is a diagrammatic plan view of the three grids that make up the grid shutter, when in the closed set condition;

Fig. 3 is a detail in elevation of the front grid;

Fig. 4 is a detail in elevation of the central or stationary grid;

Fig. 5 is a detail in elevation of the back grid;

Fig. 6 is a rear elevation of Fig. 1, showing the latching and tensioning means;

Fig. 7 is a cross section of Fig. 6 on the line 7—7 thereof showing the shutter grids in closed condition;

Fig. 8 is a front elevation of the shutter with the shutter cover plate and the shutter grids removed;

Fig. 9 is a fragmentary detail of the lower grid guide boss;

Fig. 13a is a side elevation partly in section, showing the application of my invention to a focal plane camera using the mirror for capping the grid shutter;

Fig. 19 is a front elevation of a camera showing the grid shutter applied to a standard between-the-lens shutter and connected for photoflash synchronization; and Fig. 20 is a diagram showing the duration of flash illumination, having indicated thereon the portion of flash used when making an exposure with a grid shutter.

Figure 10:
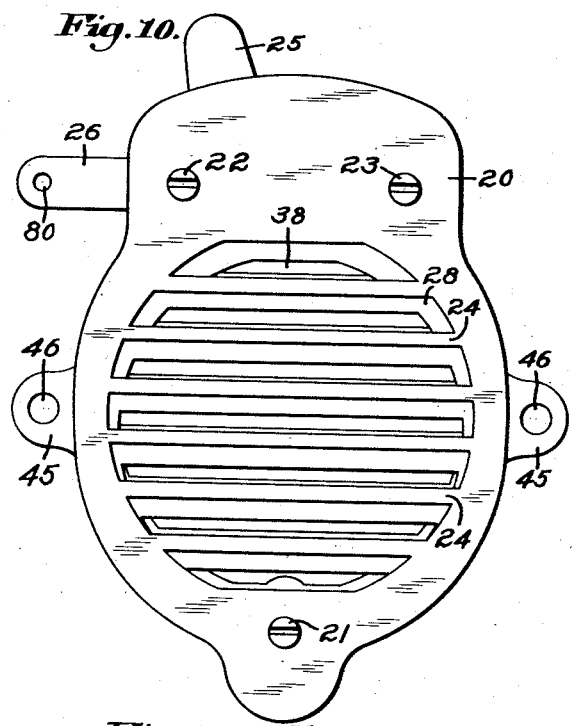
Fig. 10 is a front elevation of the grid shutter shown in closed condition.

Important objects of this invention are to provide a shutter for obtaining very rapid exposures that are of relatively high efficiency; to provide means for coupling a high-speed shutter to a conventional between-the-lens shutter and which is to be operated thereby; to provide a high-speed shutter having grids that permit an extremely short movement of the masses constituting the shutter grids; to provide a high-speed grid shutter that can be attached to a camera and synchronized therewith; and to provide a shutter that can be synchronized with any of the flash bulbs now manufactured.

This invention relates to new high-speed shutters using movable grids instead of the usual leaves or curtain. There have been numerous attempts to supply a shutter that can be used either as a between-the-lens shutter or a shutter to be attached to a lens barrel, operating either before the lens or behind the lens, to enable the operator to make a very rapid exposure. There are available numerous so-called high-speed shutters, but the highest speed in any shutter other than a focal plane shutter that I have been able to test is operated under 1/400 of a second. This is not sufficient speed to stop motion in certain types of pictures, as, for instance, in various sports, automobile racing, etc. The focal plane shutter is capable of giving speeds of 1/1000 of a second and higher, but when using this type of shutter there is always a displacement or distortion of the image.

Another drawback of the focal plane shutter in high-speed picture making arises when photoflash bulbs are being used. It is now possible to synchronize certain of the photo-flash bulbs with focal plane shutters to obtain fairly satisfactory results. Nevertheless the said displacement or distortion is maintained, and the flash bulb must have a duration of usable light of around thirty milliseconds. These flash bulbs are sold in rather small quantities and are hard to secure, and the cost is considerably more than of the flash bulb with a shorter light peak.

Another great disadvantage of the focal plane shutter with respect to the shutter herein disclosed is that if a flash bulb has a peak of, say, one million lumens seconds, the focal plane shutter, in making an exposure, uses a very narrow slot when the most rapid speeds are obtained. In a representative focal plane shutter, this slot or opening is approximately ⅛ of an inch wide, and in a 4 x 5 camera, such slot has to travel four inches. Actually, it only travels ⅛ of an inch in $\frac{1}{1000}$ of a second, and the flash duration to be available has to be sufficient to allow the aperture to travel entirely across the focal plane of the camera. Thus, if the travel is four inches, and the slot is ⅛ of an inch, it requires 32 milliseconds for the curtain to travel entirely across the focal plane. This would necessitate a lamp maintaining a sufficiently high illumination for 32 milliseconds, even though an exposure of $\frac{1}{1000}$ of a second is being made.

In my present invention, however, if the exposure is $\frac{1}{1000}$ of a second, the peak of illumination would only have to be supplied in excess of one millisecond. It is a well-known fact in the manufactuer of flash bulbs that either a long duration of flash with a fairly low peak, or a very high peak of illumination of very short duration is possible. The great majority of lamps that are manufactured today have a rather short peak lasting from five to eight milliseconds. Such a lamp has become the standard and it is readily obtainable on the market at a very low price.

In the use of my invention, employing a grid shutter, a maximum shutter opening of 60 per cent can easily be obtained, by reason of the employment of three grid plates in face-to-face relation (one of which is preferably stationary and the other two of which are preferably moved simultaneously in opposite directions), the bars of which plates are all flat and of substantially the same cross dimension, being very materially less than the cross width of each of the spaces of the plate, so that when the flat bars of all three grid plates are superposed, they do not, in the disclosed embodiment of the invention, obstruct in excess of forty per cent of the total area within the rim of each grid plate, as will be evident from the figures of the drawings, and particularly Figs. 3, 4, 5 and 7. Therefore, I can make use of 50 per cent of the light produced by a photo-flash bulb during its peak, whereas in the focal plane shutter, even with the long duration type of flash bulb, when making an exposure of $\frac{1}{1000}$ of a second, the aperture only moves $\frac{1}{32}$ of the distance across the focal plane. It is impossible in such case ever to obtain an efficiency in the use of the illumination greater than 10 per cent.

I will now describe two embodiments of the mechanism of my invention, both involving a grid structure as an element of a new combination of parts of elements for effecting synchronization of greatly increased shutter speed. In the first embodiment thereof shown in Figs. 1 to 13a, the grid shutter is adapted to be attached to any lens mount, and the focal plane shutter or the mirror of a reflex camera may be employed for capping the grid shutter; and in the second embodiment thereof, shown in Figs. 14 to 19, the grid shutter (which, as to the details of the several elements or parts thereof, is of essentially the same construction as what is shown in Figs. 1 to 13, and which, therefore, is not again shown in detail as to all the said elements or parts excepting so far as is necessary to indicate slight desired changes in certain of said parts) is mounted on the lens barrel of a lens fitted to a between-the-lens shutter, the grid shutter being operated by one member or part of the between-the-lens shutter. My invention is not limited to these two embodiments, and my invention may be otherwise practised.

I will describe these two disclosed embodiments in the specified order.

Referring first to Figs. 1 to 5, wherein the parts are shown of the high-speed grid shutter that is particularly adapted to be attached to the lens barrel of the camera either in front or in back of the lens board therefor, the outer cover of the shutter is indicated at 20, it being attached to the shutter frame by means of screws 21, 22, 23. The said cover 20 is provided with a central opening having a grid formation extending thereacross composed of grid bars 24, 24. The purpose thereof is to protect the operating grid plates or leaves of the grid shutter. The grid shutter itself is provided with a setting or reset lever 25, the purpose whereof is to cock or set the shutter grid plates or leaves prior to an exposure. The grid shutter is released by means of a release lever 26, thereby permitting the shutter grid plates or leaves to move in their functioning operations.

In Fig. 2, there are represented the three shutter grid plates or grid leaves superimposed upon each other, so that the various grid bars thereof overlap and exclude all light from the lens. The front grid plate or leaf is represented at 27. While it may be of any suitable material, it is preferably a very thin sheet metal, desirably beryllium copper having a large central opening crossed by grid bars 28, 28, and having elongated slots 29 and 30, 30, for guiding the said grid plate or leaf. Between the said slots 30, 30 is a transversely extending slot 31 which is of substantially an inverted or reversed S formation, and forming a cam or cam path for operating the said shutter plate or leaf 27. Underlying the said front grid plate or leaf 27 is an intermediate or central stationary grid plate or leaf 32, shown separately in Fig. 4, and having grid bars 33, 33 and mounting holes 34 and 35, 35. Between the mounting holes 35, 35 is an arcuate slot 36 transversely extending and providing clearance for the operating pin, to be described. Underlying the said central stationary grid plate or leaf is the back grid plate or leaf 37, separately shown in Fig. 5 and having grid bars 38, 38, an elongated bottom slot 39, and, at the top, two elongated slots 40, 40 between which latter is a transversely extending cam or cam path formed as a slot of substantially S-shape similar to the slot 31, but oppositely disposed. Actually in the disclosed construction, each of the flat grid bars 28, 33 and 38 has a transverse width that is three-fifths the width of the adjacent space at either side of such bar.

Referring next to Figs. 6, 7 and 8, wherein certain of the parts are shown, the shutter mounting or back plate is shown at 42, it having a centrally extending tubular portion or barrel 43 to which is attached a mounting flange 44 having mounting ears 45, 45 and mounting holes 46, 46. Also fitted to the said shutter mounting or back plate 42 is the shutter release lever 26 secured to said plate by a shoulder screw 47. On the opposite end of the said release lever 26 is provided in any suitable way a release dog 48, the purpose of which is to engage and hold a shutter release pin 49 of the shutter setting or reset lever 25. Attached to the said shutter release pin 49 is a coiled spring 50 wrapped partially about the shutter barrel 43 and held in position by means of a shoulder screw 51 threaded into the shutter mounting or back plate 42. The said coiled spring 50 tends to move the shutter release pin 49 in a clockwise direction, viewing Fig. 6. The shutter setting or reset lever 25 is connected to a shutter setting ring 52, best shown in Fig. 8, said shutter setting ring being fitted to a cylindrical projection 53 of the shutter barrel 43, as most clearly shown in Figs. 7 and 8. The said shutter mounting or back plate 42 has, as best shown in Fig. 8, an arcuate slot 54 for the passage of the shutter release pin 49. The said shutter setting ring 52, as shown in Fig. 8, is provided with a cutaway segment 55 for engaging a bushing 56 of the shutter mounting or back plate 42, thus limiting the movement of the said shutter setting ring 52.

Inasmuch as the shutter release pin 49 is caused to turn in a clockwise direction by the coiled spring 50, viewing Fig. 6, when the setting or reset lever 25 is moved in a contraclockwise direction, the said shutter release pin 49 will be engaged by the dog 48, thus holding said setting or reset lever 25 in that position until released by the release lever 26. The said dog 48 is caused to be turned in a contraclockwise direction for engagement with the shutter release pin 49 when in the set condition by a spring 57, shown in Figs. 6 and 7 as secured to the shutter mounting or back plate 42 by a screw 58. The movement of the said shutter release lever 26 is limited by stop pins 26a, 26a, which are attached as shown in Fig. 6, to the shutter mounting or back plate 42. Also attached to the front face of the said plate 42 are guide bushings 59 and 60 shown in Fig. 8.

Figure 11:
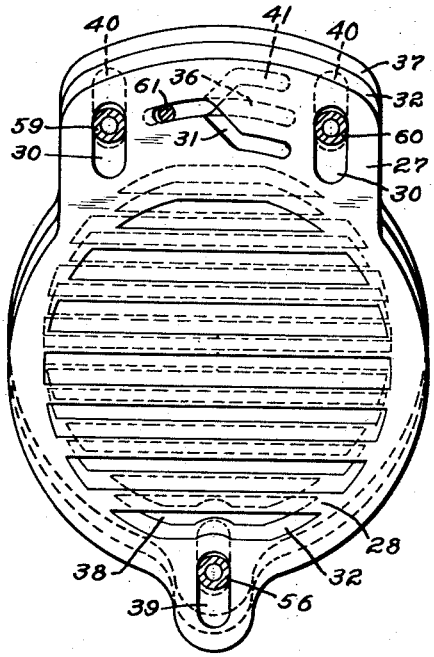
Fig. 11 is a diagrammatic view of the shutter grids when the shutter is in a released or rundown condition, as in Fig. 10.

Referring particularly to Fig. 7, the said shutter release pin 49 extends through the slot 54 and is anchored to the shutter setting or reset lever 25 and projects therebeyond as a cylindrical finger 61, passing through the cam slot or path 31 of the front grid plate or leaf 27, through the clearance provided by the slot 36 of the central stationary grid plate or leaf 32 and through the cam path or formation 41 of the back shutter grid plate or leaf 37. The slot 29 of the shutter grid plate or leaf 27, the hole 34 of the shutter grid plate or leaf 32, and the opening 39 of the shutter grid plate or leaf 37, are all placed over the guide stud or bushing 56, shown upon an enlarged scale in Fig. 7. The said stud or bushing 56 is shown upon an enlarged scale in Fig. 7. The said stud or bushing 56 serves also as a spacer between the shutter mounting or back plate 42 and the shutter outer cover 20. The elongated openings 30, 30 of the grid plate or leaf 27, the holes 35, 35 of the shutter grid plate or leaf 32 and the elongated openings 40, 40 of the grid plate or leaf 37 are all placed over the guide studs 59, 60, respectively, and are so relatively positioned that the finger or operating pin 61 passes through the cam formation or path 31 of the grid plate or leaf 27, through the clearance opening 36 of the stationary grid plate or leaf 32 and through the cam formation or path 41 of the grid plate or leaf 37. As the shutter setting or reset lever 25 is in its released position, the several shutter grid plates or leaves are positioned as shown in Fig. 7, and also in Fig. 11, wherein the front grid plate or leaf 27 is shown as having been moved downwardly under the influence of the operating pin 61 and the cam formation or path 31. The shutter grid plate or leaf 32, however, always remains fixed, being mounted in a stationary position, and the shutter grid plate or leaf 37 will have been moved upwardly under the influence of the operating pin 61 and the cam formation or path 41, so that the several grid plates or leaves are positioned as shown in Figs. 7, 10 and 11.

If, now, the shutter setting or reset lever 25 is moved in a clockwise direction viewing Fig. 1, the movable grid plates or leaves will be moved to the position shown in Fig. 2, wherein the grid plate or leaf 27 is shown as moved upwardly under the influence of the operating pin 61 and of the cam formation or path 31. The central shutter plate or leaf 32, of course, remains stationary, and the back grid plate or leaf 37 will be moved downwardly into the position shown in Figs. 1 and 2.

When the shutter setting or reset lever 25 has been moved in a clockwise direction to the position shown in Fig. 1, the shutter release pin 49 will be engaged by the dog 48 of the release lever 26, and the several grid plates or leaves will be in the position shown in Fig. 2. The said cylindrical operating pin 61, which extends through the cam formations or paths 31 and 41 and the clearance slot 36, will also be in the position shown in Fig. 2. When the shutter release lever 26 is pressed, thereby releasing the shutter release pin 49, the shutter setting or reset lever 25 will be moved in a contraclockwise direction, viewing Fig. 1, or in a clockwise direction viewing Fig. 6, through the instrumentality of the coiled spring 50.

Inasmuch as the operating pin 61 is attached to the setting or reset lever 25, the said operating pin 61 will be caused to travel with the setting or reset lever 25, namely, in a contraclockwise direction viewing Fig. 2, when the shutter release lever 26 has been depressed. When the said operating pin 61 reaches the position shown in Fig. 13, the grid plate or leaf 27 will be moved downward until the openings therein coincide with the openings in the grid plate or leaf 32, and the grid plate or leaf 37 will be moved upwardly until the openings therein coincide with the openings in the grid plate or leaves 27 and 32. The grid shutter will then be in the full open position or condition shown in Fig. 12, the grid plates or leaves thereof being positioned as shown in Fig. 13, and the shutter setting or reset lever 25 will also be in the position shown in Fig. 12.

Figure 12:
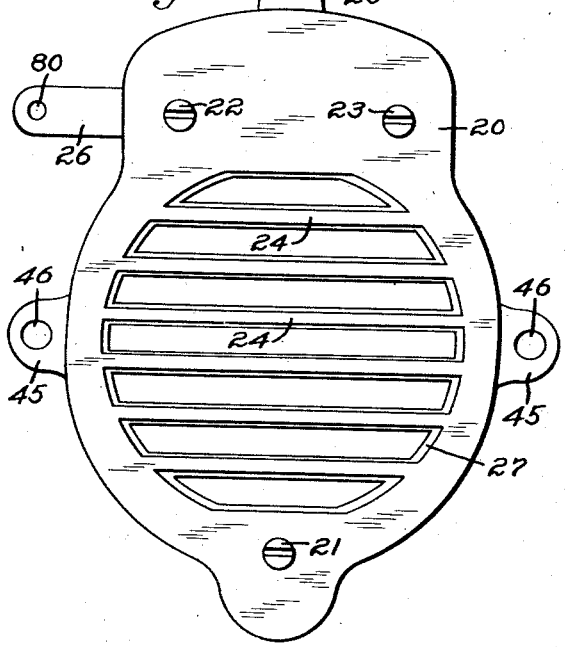
Fig. 12 is a front elevation of the shutter, the shutter having been released, and the grids having reached a position wherein the shutter is open.
Figure 13:
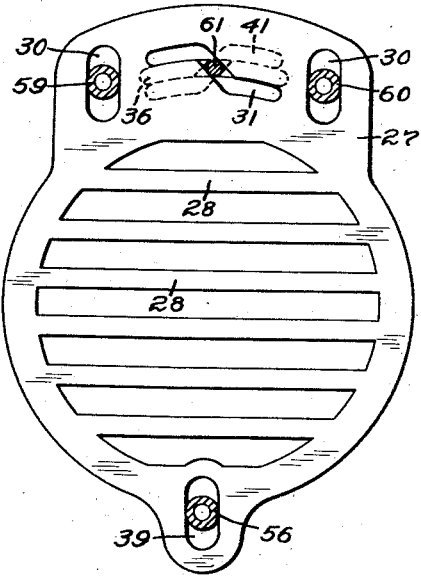
Fig. 13 is a diagrammatic view of the shutter grids when in the condition shown in Fig. 12.

As the said setting or reset lever 25 and the operating pin 61 continue to travel in a contraclockwise direction, viewing Fig. 12, until the position shown in Fig. 10 is reached, the said operating pin 61 will have reached the position shown in Fig. 11, wherein the grid plate or leaf 27 is shown as moved all the way down, and the grid plate or leaf 37 moved all the way up, thus completing the exposure. As the shutter setting or reset lever 25 is moved in a clockwise direction, viewing Fig. 1, carrying with it the operating finger 61, the grid plates or leaves will be caused to be moved to the position shown in Fig. 2. That is to say, the grid shutter or leaf 27 will be moved all the way up and the grid plate or leaf 37 will be moved all the way down, thus again closing the grid shutter, but restoring it to the set condition in which the operating pin 61 will be in the position shown in Fig. 2, and the release pin 49 will be engaged by the dogs 48, ready for a second exposure.

The grid shutter just described and constituting a part of the said first embodiment of my invention, is an attachment adapted to be placed on the lens barrel of a photographic lens as in Fig. 13a, and to be held thereto by screws (not shown) passing through the holes 46, 46 of the lugs 45, 45, into the usual lens board of the camera. If not other shutter is used in the camera, it would be necessary to put the dark slide in the plate holder when the grid shutter is reset for a second exposure.

The grid shutter herein disclosed, however, is particularly well adapted to be used on a reflex type of camera, especially when taking photoflash exposures, as the mirror of the said camera will then serve as a capping means when resetting the grid shutter and the grid shutter can be actuated or released for exposure by any well known or suitable means, such as by the use of the magnet of a synchronizer tripper that is disclosed in my co-pending application Ser. No. 346,395, filed July 19, 1940, and an electrical contact can be made when the pivoted mirror of the camera reaches a point close to the end of its travel in an upward direction.

Such method of operation and such construction, arrangement and relation of parts are indicated and shown in Fig. 13a, wherein the casing or frame of a reflex camera of the well known Graflex type is indicated at 62, it having a pivoted mirror 63, a mirror reset arm or lever 64, a mirror holding latch 65 supported on a shoulder screw 66, a mirror release lever 67 having fast therewith a shaft 68 suitably mounted in the casing of the camera, and a second lever 69 fast on the shaft 68. When the mirror release lever 67 is depressed, the shaft 68 is turned thereby in a clockwise direction, carrying with it the said second lever 69 which engages one end of the mirror holding latch 65, causing it to turn in a contraclockwise direction, thereby releasing the pivoted mirror 63, shown as mounted fast for rocking movement upon a shaft 70, thus causing said mirror to swing upwardly under the influence of a spring (not shown), but well known in the art. As the said mirror 63 swings upwardly, turning the shaft 70, the mirror reset arm or lever 64 will be caused to turn in a contraclockwise direction, and when said mirror reaches the end of its upward travel, the shutter curtain 71 will be released and allowed to run down. The structure of such shutter curtain and its manner of operation are well known in the art.

When preparing the camera for an exposure, the said shutter curtain 71 is wound to the "open" condition, indicated on the shutter speed dial by the letter "O," the mirror having been previously reset. While the shutter curtain 71 is in the "open" condition, light cannot reach the sensitized material inasmuch as the mirror 63 intercepts any light coming through the object lens, and deflects it to the usual focusing screen or ground glass 72. The said reflex camera is equipped with the usual lens barrel 73 and lens board 74, and to the forward portion of the said lens barrel 63 there is attached the grid shutter of the said disclosed embodiment of my invention. There is also attached to the lens board 74 a magnetic tripper 75 by means of a bracket 76 secured to the lens board by screw 77. The said magnetic tripper has a connecting link 78 secured to the shutter release lever 26 of the grid shutter, shown in detail in Figs. 1 to 13, by means of a shoulder screw 79, shown in Fig. 14 as passing through a hole 80 therein (that is shown in Figs. 1, 6, 10 and 12 in the said release lever 26).

In order to make an exposure, the shutter setting or reset lever 25 is turned in a clockwise direction to the position shown in Fig. 1, the mirror 63 having been previously set in the position shown in Fig. 13a and the shutter curtain 71 being moved or adjusted to the "open" position. When the said mirror release lever 67 is released, thus releasing the mirror 63, the latter swings upwardly, turning the shaft 70 and the mirror reset arm or lever 64, which latter will engage the insulating button 81 of the contact arm 82, shown in Fig. 13a as attached to the camera casing 62 by wood screws 83, 83, thus causing the contact or terminal 84 to engage the contact or terminal screw 85 threaded into a contact screw supporting member 86 secured to the camera casing 62 by wood screws 87, 87, thus completing a circuit through the wire 89 attached to the contact screw supporting member or block 86, the magnetic tripper 75, the wire 90, the battery 91, the wire 92 and the contact arm 82. Attached to the wire 90 is a wire 93 connected to one terminal of the flash bulb 94, and to the wire 89 is connected a wire 95 that is itself connected to the other terminal of the flash bulb 94.

In the said first embodiment of my invention, I have disclosed very simple but accurately functioning means for completing the circuit through a magnetic tripper such as shown at 75 in Fig. 13a, for the purpose of actuating the movable parts or elements of the grid shutter. It will be apparent, however, that within the scope and purpose of my invention, the grid shutter may be actuated in a great many different ways. For example, the electrical contacting mechanism shown in the patent to Torkel Korling, No. 2,029,238, dated January 28, 1936, may be used.

The second embodiment of my invention is shown in Figs. 14 to 19 of the drawings, wherein the grid type of shutter herein disclosed in Figs. 1 to 13 is attached to a conventional between-the-lens shutter. For the purpose of fully disclosing such second embodiment of my invention, I have elected to show a shutter of the well known Compur type, but within the scope of my invention, any suitable type of between-the-lens shutter may be used.

Referring to said Figs. 14 to 19, the between-the-lens shutter is designated generally at 96 and the conventional lens board at 97, the shutter being mounted thereon and having a rear lens element 98 protruding through the lens board 97. The said between-the-lens shutter 96 is provided with the usual reset lever 99 and the usual release lever 100. In order to operate the shutter by remote control or in synchronism with a photo-flash bulb, I have provided a magnetic tripper 101 preferably of the general structure previously referred to in the explanation of one use of the grid shutter of my invention, and I have provided a mechanical connection 102 for the purpose of connecting an armature of the said tripper 101 to the shutter release lever 100. The said magnetic tripper is secured to the lens board 97 by a bracket 103 held to the said lens board by screws 103a. Attached to the front lens cell of the between-the-lens shutter 96 is the grid shutter, indicated generally at 104, which is preferably of substantially the structure herein disclosed in connection with the first embodiment of my invention disclosed in Figs. 1 to 13, certain of the elements or parts of the said grid shutter being preferably slightly modified in attaching said grid shutter to a between-the-lens shutter, as will now be described.

Figure 18:
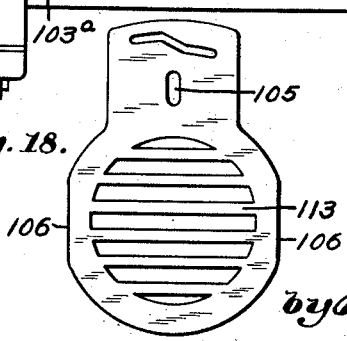
Fig. 18 is an elevation of the front grid used in the shutter shown in Fig. 14.

The grid shutter of the second embodiment of my invention is actuated by the between-the-lens shutter 96, and therefore it is not equipped with a separate setting and releasing means. Furthermore, the shutter grid plates or leaves are also modified in that only one guiding slot 105 is provided, as shown in Fig. 18, and the further guiding of the plates or leaves is obtained by the flattened edges 106, 106, shown in said figure. Such grid shutter of the second embodiment of my invention is provided with three grid plates or leaves respectively having the cam formations or slots, shown in Figs. 3, 4 and 5 of the drawings. The grid shutter is also provided with a back flange 107, shown in Fig. 15, which is clamped to the front lens cell of the camera by means of clamping screws 108, 108, Fig. 14. The back flange 107 is secured to a back plate (not shown, but which is of a construction similar to that shown in Fig. 8 hereof). The shutter grid plates or leaves are placed between the said back plate and the shutter front cover plate 109 that is held to the back plate by screws 110. The said shutter front cover plate 109 is provided with an elongated segmental opening 111 for receiving the shutter grid plates or leaves-operating pin 112. The grid shutter is provided, as in the first embodiment of my invention, with three grid plates or leaves, namely, a movable outer or front grid plate or leaf, a stationary central grid plate or leaf and a movable back grid plate or leaf, the said outer grid plate or leaf having grid bars 113, the said central grid plate or leaf having grid bars 114 and the back grid plate or leaf having grid bars 115.

Figure 14:
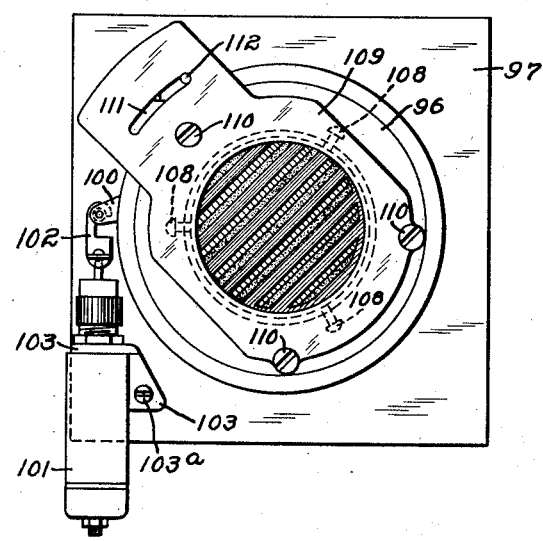
Fig. 14 is a front elevation of the grid shutter as applied to a standard between-the-lens shutter, the grid shutter being in closed condition.
Figure 15:
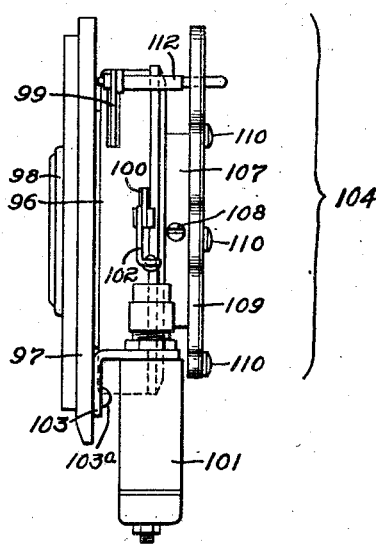
Fig. 15 is a left side elevation of Fig. 14.

In Fig. 14, the between-the-lens shutter cocking or setting or resetting lever 99, which is more fully indicated in Fig. 15, has been turned in a clockwise direction until the between-the-lens shutter is set, thus carrying with it the grid shutter operating pin 112, and during this cycle the grid bars 113 have been moved in an upward direction and the grid bars 115 in a downward direction, thus completely closing the shutter opening.

Figure 16:
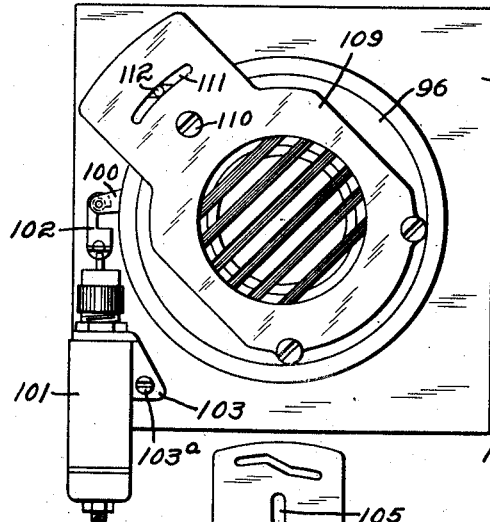
Fig. 16 is a front elevation similar to Fig. 14, but showing the shutter released, the shutter grids being shown in the fully opened condition.

In Fig. 16, however, the between-the-lens shutter has been released by the magnetic tripper 101 and the shutter tripper lever 100, so that the between-the-lens shutter 96 is fully opened, and the grid bars 113, 114, 115 all overlie each other, thereby providing maximum openings, and the shutter grid operating pin 112 has traveled to a central position in the slot 111.

Figure 17:
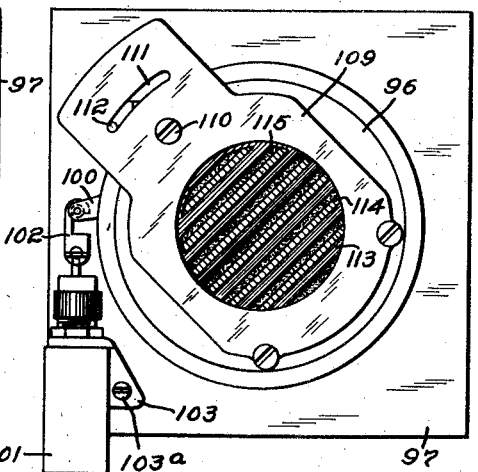
Fig. 17 is a view similar to Fig. 14, but wherein the shutter has been operated and is in closed condition prior to resetting.

In Fig. 17, the grid operating pin 112 has, however, traveled all the way to the end of the said slot 111, thus again moving the outer grid bars 113 in a downward direction, and the back grid bars 115 in an upward direction, such motion continuing until the grid bars 113, 114 and 115 completely close the said openings.

It will be understood that I have thus provided means for converting a conventional between-the-lens shutter having a set lever into an ultra high-speed shutter having the grid plates of the grid shutter of my invention operated by the usual between-the-lens shutter, and I desire to claim broadly means for accomplishing this generic result. Other means than those shown may, within the scope of my invention be provided for this purpose.

Making reference to Fig. 19, there is therein shown a camera designated generally at 116, which may be of any suitable type (whether Graphic, Graflex or other type), and which has been equipped, in accordance with my invention, with a between-the-lens shutter 96 and an auxiliary grid shutter such as herein disclosed and provided with the magnetic tripper 101 connected to the battery case 117 by means of a cable 118. Desirably the battery case has the usual reflector 119 and there is provided a suitable flash bulb 120. It will be understood, however, that within the scope of my invention, the shutters of this embodiment of my invention may be operated by manual pressure on the shutter release lever 100 of Fig. 15, when photo-flash bulbs are not used, or the usual cable release can be used for making exposures when the flash synchronizer is not being used. It is to be understood that the synchronization may be effected in any suitable manner and that I need not employ for that purpose a magnetic tripper, but may provide any suitable means whether electrical or otherwise for accomplishing this result.

By means of the structure shown in Figs. 14 to 19, and constituting the second embodiment of my invention, it is possible to make photo-flash exposures of a duration of $\frac{1}{1000}$ of a second or less, using the conventional between-the-lens shutter as a capping means for the grid shutter of my invention.

In the usual between-the-lens shutter of the Compur type, the shutter reset lever 99, shown in Fig. 15, starts to travel in a contraclockwise direction, viewing Fig. 14, when the said between-the-lens shutter is released by the release lever 100. The shutter leaves of a between-the-lens shutter start to open as soon as the reset lever 99 starts to move, and the said leaves of the between-the-lens shutter continue in motion until said reset lever reaches the limit of its travel, at which time the shutter leaves of the between-the-lens shutter have again closed.

Inasmuch as in the grid shutter which constitutes an element of the new combination herein claimed as a feature of my invention, I use approximately only one third of such travel in order fully to open and fully to close the said grid shutter, the exposure made by the grid shutter will be approximately three times as fast as the exposure made by the between-the-lens shutter. Thus, if the between-the-lens shutter is set for $\frac{1}{300}$ of a second, the actual exposure obtained by said grid shutter will be $\frac{1}{900}$ second, and inasmuch as the leaves of the between-the-lens shutter are fully opened between the period of opening and closing of the grid shutter, the leaves of the between-the-lens shutter in no way restrict the passage of light through the grid shutter as it opens and closes.

Both embodiments of my invention provide respectively a new combination wherein the grid shutter cooperates in securing a new result, and whereby there is secured a greatly increased speed of exposure in synchronization with the peak of the illumination of the photo-flash lamp.

In each of said embodiments I combine the grid shutter with another shutter of the camera, and in each of said embodiments I synchronize the grid shutter and such other shutter of the camera with the peak of the flash of the photo-flash bulb, and in doing so obtain an exposure that is very much faster than can be had either with the focal plane shutter, constituting an element of the combination of the first embodiment of the invention, or with the between-the-lens shutter, constituting an element of the combination of the second embodiment of the invention.

When the grid shutter is used in combination with the focal plane shutter, as disclosed in Fig. 13a hereof, a much faster exposure can be obtained than can be otherwise had with a standard flashlight bulb, because with such standard bulb the duration of flash is not long enough to give a complete exposure, but when using the grid shutter in combination with the focal plane shutter, a wide open aperture of the focal plane shutter can be used, and the actual exposure will be controlled by the grid shutter. This is a very important feature of the invention, and within the scope thereof any suitable construction of grid shutter may be employed as an element of the combination so long as the structure of such grid shutter is capable of producing the desired result.

Referring to the second embodiment of the invention, I have already pointed out that by employing a grid shutter in the new combination, I can obtain an exposure approximately three times as fast as the exposure made by a between-the-lens shutter alone. If, for example, with a between-the-lens shutter, I obtain an exposure around $\frac{1}{250}$ of a second, I am enabled by the new combination, which includes the grid shutter in co-action with a between-the-lens shutter, to get an exposure approximately three times faster.

Referring again to the second embodiment of the invention, if I should use a Graflex type of camera (as illustrated diagrammatically, for example, in Fig. 13a of the drawings) and employ a synchronizer and use the ordinary flash-bulb therein, it would be impossible, in the absence of the grid shutter (and while the illumination of the flash bulb is at its peak) to cover fully the plate or film during the shutter travel, for the reason that the duration of flash produced by such a bulb is not of sufficient length to allow the shutter aperture to travel all the way across the focal plane while the illumination of the bulb is substantially at its peak. Thus, the resulting negative would not be uniformly exposed. It has heretofore been a common practice to use the full aperture of the focal plane shutter curtain when making flash exposures, and to use the duration of the flash of the bulb to control the time of exposure; that is, the focal plane shutter curtain would be maintained fully open and the exposure continues as long as the effectiveness of the flashlight endures.

Some bulbs are now manufactured with a very short flash of about $\frac{1}{200}$ of a second. When special bulbs were used having a long duration of flash, the focal plane shutter could be used to give very rapid exposure because the flash was long enough for the narrow aperture of the focal plane shutter curtain to pass all the way across the focal plane. Since, however, only a very narrow portion of the negative is exposed at a time, as the curtain aperture passes across the focal plane, the light is necessarily used in a very inefficient manner. Thus, for example, if the total area at the focal plane were 4 inches and a $\frac{1}{8}$ inch curtain aperture were used, the total amount of light reaching the sensitized area would, of course, be the total light produced by the photoflash lamp divided by 32, inasmuch as only $\frac{1}{8}$ inch of the area is exposed at any one time and the light would have to be maintained while the curtain travels 4 inches. Thus the efficiency of such old combination of parts was very low.

By providing a grid shutter as an element in the new combination and employing a tripper to be operated from the circuit, the full curtain aperture of the focal plane shutter can be used, and the grid shutter is synchronized with the peak of the photo-flash lamp, so that a very high shutter speed can be secured, with a very high efficiency.

A new result is obtained by the new combination which includes in each embodiment of my invention some existing shutter of the camera, with a second shutter, the latter being of the grid type, both said shutters being synchronized with the flash of the photo-flash bulb, the other or previously existing shutter just referred to being, in the first embodiment of the invention, disclosed as a focal plane shutter, and in the second embodiment of the invention being disclosed as a between-the-lens shutter.

In referring to another or previously existing shutter of the camera as used in the new combination with a grid shutter, such other shutter might be any suitable type, either of the focal plane type or of the between-the-lens type. With any acceptable between-the-lens shutter of the general character disclosed by me, the inclusion in the new combination of a grid shutter will result in speeding up the shutter action by a factor of at least three, and synchronization is obtained with the peak of the illumination of the photoflash lamp in such case.

I have by way of illustration referred to a figure of $\frac{1}{250}$ of a second, as I believe this is actually about the fastest speed that can be obtained by commercially available between-the-lens shutters. Some between-the-lens shutters are marked $\frac{1}{400}$ of a second, and if they do obtain a speed of $\frac{1}{400}$ of a second, by my new combination employing a grid shutter and such between-the-lens shutter, I obtain a speed of $\frac{1}{1200}$ of a second and effect synchronization of the peak of the illumination of the photo-flash lamp therewith.

While the main function of the other shutter of the camera, to which I have referred as present in both embodiments of my invention, is to cap the lens while the grid shutter is being reset, that is not the only function of such other shutter in the combination. This is evident from the fact that in the second embodiment of the invention the mechanism of the between-the-lens shutter actually operates the grid shutter, and in the first embodiment of the invention some of the operating parts of the focal plane shutter initiate the operation of the grid shutter. That is to say, referring to said first embodiment of my invention, in a camera of the Graflex type the mirror actually releases the shutter and therefore becomes a part of the shutter mechanism.

Referring to the focal plane shutter, as in a Graflex focal plane shutter type of camera, the focal plane shutter is released by the mirror, which controls the contacts for flashing the photo-flash lamp and actuating the magnetic tripper. This entire cycle takes place very fast, the mirror acting as a release lever for the focal plane shutter, the latter being automatically opened by the curtain roller spring and the contact timing on the mirror is such that the flash lamp will be ignited about the time the focal plane shutter curtain reaches a full open condition, and in the new combination herein disclosed the grid shutter, being controlled by the same circuit, is caused to function while the focal plane shutter is in its full open condition. In other words, the grid shutter starts to open at the time or very close to the time that the focal plane curtain shutter reaches the wide open condition.

It is not necessary that the focal plane shutter be of any particular type. It might, for example, be of the type disclosed in the patent to Edson S. Hineline, No. 2,242,124, May 13, 1941, or of any other suitable type.

When employing the grid shutter on a camera of the Speed Graphic type, as in said second embodiment of the invention, contact is obtained for operating the grid shutter by some operating part of the shutter mechanism of the other shutter of the camera, and therefore in such case such other shutter is more than merely a capping means.

As already stated, when using a between-the-lens shutter in the new combination, that contains also the grid shutter, I increase the speed of the between-the-lens shutter by the factor of three, and the same synchronizer that synchronizes the between-the-lens shutter also synchronizes the grid shutter. The peak of the illumination of the flash is narrow and the said three times greater speed would result in the use of only that part of the light which is at or very close to the peak of the flash. Therefore, the light is used at a greater efficiency than heretofore.

In both said embodiments of the invention (that is, whether using the between-the-lens shutter or the focal plane shutter as the other shutter of the camera in the new combination), such other shutter must be and is in the full open condition during the exposure cycle of the grid shutter. That is to say, the greater part of the time that the grid shutter is in operation, the between-the-lens shutter leaves are fully open and in stationary condition, even though such stoppage of the shutter leaves is a very small fraction of a second.

In describing the two embodiments of my invention herein shown, I have referred to three grid plates or leaves, one of which is stationary and two of which are movable. Within the broad scope and purpose of my invention, other number of shutter grid plates or leaves may be employed, but a two-grid plate or leaf obviously functions with less efficiency than a three-grid plate or leaf, because admitting only fifty per cent of the light, and if a greater number of grid plates or leaves than three be provided, the grid bars thereof would necessarily be of such flimsy or delicate character as to render their use less desirable than the use of three grid plates or leaves which I have found in actual test to prove entirely satisfactory.

The grid bars of the several grid plates or leaves may be arranged either upright or horizontal, or at any angle therebetween, within the scope of my invention. I have shown the grid bars horizontal in the first embodiment, and I have shown them inclined in the second embodiment. While I have, in the two disclosed embodiments of my invention, shown one of the grid plates or leaves as always stationary, I may for some purposes, within the broad scope of my invention, make all the grid plates or leaves movable, as by entirely omitting the stationary leaf or plate, or moving it to and fro in substantially the same manner as the herein shown movable plates or leaves. I prefer, however, to employ a stationary grid plate or leaf as herein disclosed, without limiting myself thereto.

I have referred in the specification to the opening of the shutter in synchronization with the peak of the flash of the photo-flash lamp or bulb. I have in Fig. 20 diagrammatically indicated the light curve produced by a photo-flash lamp. I have plotted on the said curve the grid shutter opening of $1/1000$ second. The said diagram clearly indicates how the grid shutter herein disclosed makes possible the greatest amount of light passage to the lens of the camera at a speed of $1/1000$ second.

In the said two embodiments of my invention, I have disclosed means for practising a new method, process or art of high-speed photography, as by the use of my method photographs can be made when using the ordinary commercial and readily available photo-flash lamps to obtain speeds of $1/1500$ second, and at the same time securing fully timed negatives. In accordance with my invention, I provide in a photographic camera for the purpose of obtaining ultra high-speed shutter effects in synchronization with the flash of a photoflash lamp means for effecting the following steps or functions: (1) actuating a primary or first photographic shutter of normal speed; (2) synchronizing such primary or first photographic shutter with the flashing of a photoflash lamp in suitable juxtaposition thereto; and (3) causing the operation of a secondary shutter in the same photographic camera in synchronism with said flash while the said first shutter is itself fully opened and the illumination of the photoflash lamp is substantially at its peak, thereby securing a speed of exposure of the sensitized material held in the camera, which speed is a plurality of times faster than could be secured by the action of said first shutter alone. I believe that I am the first to provide a camera shutter working near the nodal point of the lens to obtain speed anywhere near such value.

Having thus described two embodiments of the means or mechanism of my invention, by means of which the method, process or art thereof may be practised, I desire it to be understood that although specific terms are employed, they are used in a generic or descriptive sense, and not for purposes of limitation, the scope of the invention being set forth in the following claims.

I claim:

1. In photographic equipment, in combination, for the purpose of thereby effecting synchronization between the flash of a photoflash lamp when substantially at its peak and very rapid shutter exposure, the following elements: a camera casing having a lens barrel with an objective lens; a photoflash lamp and an electric circuit including said lamp and also including contacts adapted to be opened and closed; a grid shutter mounted on the said lens barrel, and therefore close to the said objective lens; release means for the said grid shutter; and means in the said circuit caused to be operated upon the closing of said contacts to operate the said grid shutter; said camera having another shutter with means for operating the same, the said operation causing the closing of said contacts which are so positioned and so operated with respect to and in timed relation to the said grid shutter that such other shutter constitutes capping means for the said grid shutter.

2. A combination according to claim 1, but in which the grid shutter is composed of a plurality of plates, at least one of which is stationary and the remainder movable, and all of which plates are provided with spaced grid bars.

3. In photographic equipment, a photo-flash lamp, a camera having a grid shutter, a between-the-lens shutter carried by the camera in proximity to said grid shutter, operating means for said between-the-lens shutter, co-acting means between the between-the-lens shutter and said grid shutter for operating said grid shutter, and means so to synchronize the movements of said shutters and the flash of the photo-flash lamp that the grid shutter exposure is made while the leaves of the between-the-lens shutter are fully open, and while the flash of said lamp is substantially at its peak.

4. A combination according to claim 3, but in which conjoint operating means are employed for both said shutters.

5. In photographic equipment, a combination according to claim 3, but wherein the release means for the between-the-lens shutter constitutes means also to operate the grid shutter.

6. A combination according to claim 1, but in which the camera is provided with a focal plane shutter constituting such other shutter and constituting capping means for said grid shutter.

7. A combination according to claim 1, but in which the camera is a reflex camera, the movable mirror whereof constitutes capping means for said grid shutter.

8. Photographic equipment comprising a camera having a between-the-lens shutter and also a grid shutter mounted at the lens barrel of the objective lens and a photo-flash lamp and means for synchronizing in action the grid shutter and the photo-flash lamp and operatively connected with the between-the-lens shutter, thereby to make an exposure by the grid shutter when the leaves of the between-the-lens shutter are fully open, and the flash of the photo-flash lamp is substantially at its peak.

9. A combination according to claim 3, but in which synchronization is effected in the operation of said parts by a magnetic tripper.

10. A camera of the reflex type having a lens barrel and objective lens and having a movable mirror and a focal plane shutter, the operation whereof is initiated by the mirror and also having a grid shutter close to the objective lens and operable with a wide-open aperture of the focal plane shutter, said grid shutter consisting of a plurality of grid plates at least one of which is movable, said focal plane shutter acting as capping means for said grid shutter, means operatively associated with said grid shutter and said mirror to effect the making of an exposure through said grid shutter by movement of said mirror, a photo-flash lamp in electric circuit with said grid shutter operating means, and means for synchronizing the flash of the said lamp and the exposure movement of said grid shutter, said means including electrical contacts in said circuit and including the said movable mirror of the camera, acting in its movement to complete the circuit through said contacts.

11. A combination according to claim 10, but in which a magnetic tripper is employed to operate the grid shutter by the closing of said circuit.

12. In combination, a photographic camera having a between-the-lens shutter, a grid shutter attached to said between-the-lens shutter and operated thereby, a photo-flash lamp having in electrical circuit therewith a battery and a magnetic tripper, and means for so controlling said circuit and operating said parts that the between-the-lens shutter is caused to be in open condition during the exposure movement of said grid shutter.

13. In photographic equipment and in combination, for the purpose of thereby effecting synchronization between the flash of a photo-flash lamp when substantially at its peak and the very rapid exposure of a high speed camera shutter, so as to "stop motion" without displacement or distortion of the image, the following elements: a camera casing having a lens board and lens barrel with an objective lens; a photoflash lamp and an electric circuit including said lamp and also including contacts adapted to be closed and opened to change the condition of said circuit; a magnetic tripper at the lens board and included in said circuit, for operating the shutter, a release lever for said shutter and in operative relation to said magnetic tripper; a grid shutter mounted on the said lens barrel and therefore close to the objective lens, and operated by said magnetic tripper; said grid shutter having a plurality of shutter plates in face to face relation and each provided with a plurality of spaced, elongated, parallel openings, and at least one of said plates having an operating formation; operating means to engage said formation and itself operatively associated with said magnetic tripper and said release lever, thereby to impart bodily movement to at least one of such plates in a direction substantially perpendicular to the lengthwise direction of the openings thereof.

14. A combination according to claim 13, but in which one of the said grid plates is mounted in a stationary condition.

15. A combination according to claim 13, but in which the said grid shutter comprises three such grid plates, one of said plates being mounted in a stationary condition and the two other plates have operating formations compelling movement of said plates always oppositely to each other.

16. In photographic equipment and in combination, for the purpose of thereby effecting synchronization between the flash of a photo-flash lamp when substantially at its peak and the very rapid exposure of a high speed camera shutter, so as to "stop motion" without displacement or distortion of the image, the following elements: a camera casing having a lens board and lens barrel with an obective lens, a photoflash lamp and an electric circuit including said lamp and also including contacts adapted to be closed and opened to change the condition of said circuit; a grid shutter mounted on the said lens barrel and therefore close to the objective lens; a release lever for the said grid shutter; said grid shutter having a plurality of shutter plates in face to face relation and each provided with a plurality of spaced, elongated, parallel openings, and at least one of said plates having an operating formation; operating means to engage said formation and itself operatively associated with said release lever, thereby to impart bodily movement to at least one of such plates in a direction substantially perpendicular to the lengthwise direction of the openings thereof.

17. In photographic equipment and in combination, for the purpose of thereby effecting synchronization between the flash of a photoflash lamp when substantially at its peak and the very rapid exposure of a high speed camera shutter, so as to "stop motion" without displacement or distortion of the image, the following elements: a camera casing having a lens board and lens barrel with an objective lens; a photoflash lamp and an electric circuit including said lamp and also including contacts adapted to be closed and opened to change the condition of said circuit; a grid shutter mounted on the said lens barrel and therefore close to the objective lens, a release lever for the said grid shutter, and means in the said electrical circuit for operating said release lever; said grid shutter having a plurality of shutter plates in face to face relation and each provided with a plurality of spaced, elongated, parallel openings, and at least one of said plates having an operating formation; operating means to engage said formation and itself operatively associated with said release lever, thereby to impart bodily movement to at least one of such plates in a direction substantially perpendicular to the lengthwise direction of the openings thereof.

18. A combination according to claim 13, but in which the lens barrel on which said grid shutter is mounted is also provided with a between-the-lens shutter, the leaves whereof are fully open between the period of opening and closing of the grid shutter, and therefore do not restrict the passage of light through the grid shutter, and which between-the-lens shutter acts as capping means for said grid shutter.

19. A combination according to claim 13, but in which the lens barrel on which said grid shutter is mounted is also provided with a between-the-lens shutter, the leaves whereof are fully open between the period of opening and closing of the grid shutter and therefore do not restrict the passage of light through the grid shutter, and in which the said between-the-lens shutter has a resetting lever operatively connected with the movable plate or plates of the grid shutter to operate the same from the between-the-lens shutter in the said coordinated relation thereto.

20. A combination according to claim 13, but in which the lens barrel on which said grid shutter is mounted is also provided with a between-the-lens shutter, the leaves whereof are fully open between the period of opening and closing of the grid shutter and therefore do not restrict the passage of light through said grid shutter, and in which the said grid shutter is operated by a member of the said between-the-lens shutter, thereby providing an ultra high speed shutter in which the exposure made by the grid shutter is approximately three times as fast as the exposure made by the between-the-lens shutter.

21. A combination according to claim 13, but in which the camera is a reflex camera having a focal plane shutter curtain and a mirror pivoted for swinging movement, whereby the said shutter curtain or said mirror may be employed to cap the said grid shutter.

22. A combination according to claim 13, but in which the release lever is connected to the grid shutter and the magnetic tripper is connected to the said release lever.

23. In photographic equipment and in combination, for the purpose of thereby effecting synchronization between the flash of a photo-flash lamp when substantially at its peak and very rapid shutter exposure, the following elements: a camera having a lens barrel and having a shutter; a grid shutter constituting a second shutter for said camera; said grid shutter being mounted on the said lens barrel and itself comprising a plurality of shutter plates having a face to face relation and each provided with a plurality of spaced, elongated, parallel openings, at least one of said plates having an operating formation, with operating means to engage said formation or formations, thereby to impart bodily movement to at least one of such plates in a direction substantially perpendicular to the lengthwise directions of said parallel openings; and means to effect synchronization between the peak of the flash of said photo-flash lamp and the opening of said grid shutter during an open condition of said first mentioned shutter, with consequent markedly higher conjoint shutter speed, said means to effect synchronization including an electric circuit itself including said lamp and electrical contacts adapted to be closed to complete the circuit to said lamp; said means to effect synchronization also including a magnetic tripper in said circuit caused to be operated upon the closing of said contacts, and a release device for said grid shutter.

24. In photographic equipment and in combination, for the purpose of thereby effecting synchronization between the flash of a photo-flash lamp when substantially at its peak and very rapid shutter exposure, the following elements; a camera having a lens barrel structure with lens; a first shutter supported for operation in said camera; a grid shutter constituting a second shutter for said camera, mounted at the lens barrel structure, and therefore close to the objective lens of the camera; an electric circuit including said photo-flash lamp and also including contacts adapted to be closed to complete the circuit to said flash lamp; release means for the said grid shutter; and means in the said circuit caused to be operated upon the closing of said contacts to operate said grid shutter and said first shutter in the said timed relation to effect the opening of said grid shutter while said first shutter is open, and thereby to secure synchronization of a more rapid shutter exposure, that is the resultant of the said shutter opening of said two shutters in the herein described relation, with substantially the peak of the flash of the photo-flash lamp.

25. In photographic equipment and in combination, for the purpose of thereby effecting synchronization between the flash of a photoflash lamp when substantially at its peak and very rapid shutter exposure, the following elements; a camera having a lens barrel structure with lens; a between-the-lens shutter supported for operation in said camera and constituting a first shutter therefor; a grid shutter mounted at the lens barrel structure and constituting a second shutter for said camera and by which the exposure is effected; an electric circuit including said photo-flash lamp and also including contacts adapted to be closed to complete the circuit to said flash lamp; and means in said circuit to be operated upon the closing of said contacts for synchronizing said between-the-lens shutter and the flash of said photoflash lamp and for operating said grid shutter so as also to be synchronized with said flash, thereby making the exposure by the grid shutter at the instant the leaves of the between-the-lens shutter are fully opened and the flash of the photoflash lamp is substantially at its peak.

26. In photographic equipment and in combination, for the purpose of thereby effecting synchronization between the flash of a photoflash lamp when substantially at its peak and very rapid shutter exposure, at a greatly increased speed over that of a single shutter of a camera, and of very high efficiency, the following elements; a shutter supported for operation in said camera and constituting a first shutter therefor; a photoflash lamp and an electric circuit including said lamp and with operating means for said first shutter, said circuit being also provided with contacts to be opened and closed; a grid shutter closely adjacent to said lens; and means in said circuit caused to be operated upon the closing of said contacts for synchronizing said first shutter and the flash of said photoflash lamp and for operating said grid shutter so as also to be synchronized with said flash, thereby to obtain an exposure that is synchronized with the peak of illumination of such photoflash lamp, and which exposure is by comparison materially faster than could be obtained by said first shutter alone.

27. In photographic equipment and in combination, for the purpose of thereby effecting synchronization between the flash of a photoflash lamp when substantially at its peak and very rapid shutter exposure, at a greatly increased speed over that of a single shutter of a camera, the following elements; a shutter supported for operation in said camera and constituting a first shutter therefor; a photoflash lamp and an electric circuit including said lamp and with operating means for said first shutter, said circuit being also provided with contacts to be opened and closed; a grid shutter closely adjacent to said lens, and means in said circuit to be operated upon the closing of said contacts for synchronizing said first shutter and the flash of said photoflash lamp and for operating said grid shutter so as also to be synchronized with said flash, thereby making the exposure by said grid shutter while the said first shutter is itself fully open and while the illumination of said photoflash lamp is substantially at its peak, thereby securing a speed of exposure of the sensitized material that is a plurality of times faster than could be secured by a single shutter of the between-the-lens type if used in said camera, and without distortion of the resulting photograph.

28. In photographic equipment and in combination, for the purpose of thereby effecting synchronization between the flash of a photoflash lamp when substantially at its peak and the very rapid exposure of a high speed camera shutter, so as to "stop motion" without displacement or distortion of the image, the following elements: a camera casing having a lens board and lens barrel with an objective lens; a shutter supported for operation in the camera and constituting a first shutter; a photoflash lamp and an electric circuit including said lamp and also including contacts adapted to be closed and opened to change the condition of said circuit; means at the lens board and included in said circuit, for operating said first shutter, a release lever for said first shutter and in operative relation to said means; a grid shutter mounted on the said lens barrel and therefore close to the objective lens, and operated by said means at the lens board for operating the first shutter; said grid shutter having a plurality of shutter plates in face to face relation and each provided with a plurality of spaced, elongated, parallel openings, and at least one of said plates having an operating formation or formations; operating means to engage said formation and itself operatively associated with said means at the lens board for operating the first shutter and said release lever, thereby to impart bodily movement to at least one of such plates in a direction substantially perpendicular to the lengthwise direction of the openings thereof.

29. In photographic equipment and in combination, for the purpose of thereby effecting synchronization between the flash of a photoflash lamp when substantially at its peak, with very rapid shutter exposure, at an increased speed over that of a single shutter of a camera, the following elements; a camera equipped with a lens, and a between-the-lens shutter, and with a second shutter also supported for operation in said camera and capable of substantially more rapid exposures than said between-the-lens shutter; an electrical circuit having included therein a photoflash lamp, a battery, a magnetic tripper, and electrical contacts, the closing of which latter completes the said electrical circuit to operate said between-the-lens shutter and to flash the said lamp; together with mechanical connections between the said between-the-lens shutter and the said second shutter, thereby to operate said second shutter in timed relation to the functioning of said between-the-lens shutter and in synchronism with the flashing of said photoflash lamp, so as thereby to obtain an exposure which is by comparison materially faster than could be obtained by said between-the-lens shutter alone.

30. In a camera, photographic mechanism for the purpose of obtaining ultra high-speed shutter effects in synchronism with the flashing of a photoflash lamp, which comprises the following: (1) a primary or first photographic shutter of normal speed in said camera; (2) a photoflash lamp located in suitable juxtaposition to such primary or first photographic shutter; (3) a secondary shutter in the said photographic camera; and (4) means including means to operate said first shutter, and operatively co-related together in action to cause the operation of said secondary shutter in synchronism with the flash of said photoflash lamp while the said first shutter is itself fully opened by its said operating means, and the illumination of said photoflash lamp is substantially at its peak, thereby securing, through such co-related-in-action means, a speed of exposure of the sensitized material in the camera that is a plurality of times faster than could be secured by such first shutter alone.

OSCAR STEINER.